(12) United States Patent
Schuessler et al.

(10) Patent No.: US 8,485,297 B2
(45) Date of Patent: Jul. 16, 2013

(54) MOTOR VEHICLE HAVING AN ELECTROCHEMICAL CELL

(75) Inventors: Martin Schuessler, Koesching (DE); Alois Stauber, Ingolstadt (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 13/391,215

(22) PCT Filed: Aug. 4, 2010

(86) PCT No.: PCT/EP2010/004785
§ 371 (c)(1),
(2), (4) Date: Apr. 9, 2012

(87) PCT Pub. No.: WO2011/020562
PCT Pub. Date: Feb. 24, 2011

(65) Prior Publication Data
US 2012/0186891 A1   Jul. 26, 2012

(30) Foreign Application Priority Data
Aug. 21, 2009  (DE) .................. 10 2009 038 422

(51) Int. Cl.
*B60K 1/04* (2006.01)
(52) U.S. Cl.
USPC ................................................. 180/68.5
(58) Field of Classification Search
USPC .................. 180/68.5; 429/12, 13, 40, 22, 50
See application file for complete search history.

(56) References Cited

U.S. PATENT DOCUMENTS

| | | | |
|---|---|---|---|
| 6,230,833 B1 * | 5/2001 | Setsuda | 180/68.5 |
| 7,368,191 B2 | 5/2008 | Andelman et al. | |
| 7,481,984 B1 * | 1/2009 | Schuessler | 422/659 |
| 2004/0089487 A1 * | 5/2004 | Rowley et al. | 180/68.5 |

FOREIGN PATENT DOCUMENTS

| | | |
|---|---|---|
| DE | 93 20 701 | 1/1995 |
| DE | 601 28 619 | 1/2008 |
| DE | 10 2009 038 422.7 | 8/2009 |
| JP | 6-333543 | 12/1994 |
| JP | 2004-345447 | 12/2004 |
| JP | 2006-40716 | 2/2006 |
| JP | 2006-127882 | 5/2006 |
| WO | PCT/EP2010/004785 | 8/2010 |

OTHER PUBLICATIONS

International Search Report for PCT/EP2010/004785, mailed on Nov. 3, 2010.
German Office Action for Priority Patent Application DE 10 2009 038 422.7, issued on May 5, 2010.

* cited by examiner

*Primary Examiner* — John Walters
*Assistant Examiner* — James Triggs
(74) *Attorney, Agent, or Firm* — Staas & Halsey LLP

(57) ABSTRACT

A motor vehicle has an electrochemical cell, which includes an electrode stack of at least two electrodes in a parallel arrangement. The electrochemical cell is arranged outside an engine compartment of the motor vehicle in an accommodation compartment of the motor vehicle, the cross-sectional surface of which is tapered in the direction of the vertical axis of the vehicle. A cross-sectional surface of the electrochemical cell is thereby adapted to the cross-sectional surface of the accommodation compartment. Thus, particularly good use is made of the available space in the motor vehicle.

16 Claims, 1 Drawing Sheet

MOTOR VEHICLE HAVING AN ELECTROCHEMICAL CELL

CROSS REFERENCE TO RELATED APPLICATIONS

This application is based on and hereby claims priority to International Application No. PCT/EP2010/004785 filed on Aug. 4, 2010 and German Application No. 10 2009 038 422.7 filed on Aug. 21, 2009, the contents of which are hereby incorporated by reference.

BACKGROUND

The invention relates to a motor vehicle having an electrochemical cell.

Because of the high packing density of components in modern motor vehicles, optimum utilization of the available physical space is becoming increasingly important. This is particularly important in the case of battery-powered electrical vehicles, since motor vehicles such as these require a large number of batteries for their operation.

Because of the high energy density, lithium-ion rechargeable batteries are increasingly being used to provide the electrical power supply in motor vehicles. Rechargeable batteries such as these are generally in the form of so-called stack cells with a plurality of electrodes in the form of plates.

The electrodes in such stack cells normally have a rectangular shape and are stacked one on top of the other, in a superimposed arrangement. In this case, the stack is formed by an alternating sequence of anodes and cathodes, with all the anodes and all the cathodes being connected to a respective common tap pole of the cell. The connections of the individual electrodes are in this case each arranged on the same side of the electrode stack.

One such stack cell is described, for example, in U.S. Pat. No. 7,368,191 B2.

Because of the rectangular shape of the electrodes, known stack cells have a rectangular cross-sectional area overall. An installation space which likewise has a rectangular cross section must therefore be made available in the motor vehicle for a stack cell such as this. Because of this requirement, the number of possible installation positions for a battery such as this in a motor vehicle is limited. Sufficient physical space is generally available only in the engine compartment of the motor vehicle.

Furthermore, U.S. 2004/0089487 A1 discloses a battery for accommodation in a space wheel well. The electrodes of this battery have a substantially semicircular contour, in order to optimally utilize the available physical space.

JP 2006 127 882 A describes a stack cell having a reduced cross-sectional area, in which the individual electrodes have a trapezoidal geometry.

JP 633 543 A discloses a further stack cell having electrodes with a triangular shape. A plurality of such stack cells are accommodated together in a rectangular housing, in order in this way to enhance the robustness of the battery.

JP 2006 040 716 A describes a further stack cell having rectangular electrodes, which are separated by respective electrode membranes. The stack cell is bounded at the end by respective end plates, which are based with respect to one another by a screw connection.

SUMMARY

One potential object is to develop a motor vehicle of the type mentioned initially such that the physical space available for batteries is utilized better.

The inventors propose a motor vehicle in which an electrochemical cell is arranged in an accommodation compartment outside the engine compartment of the motor vehicle, which accommodation compartment has a cross-sectional area which tapers in the direction of the vehicle vertical axis. In order to utilize the accommodation compartment as completely as possible, a cross-sectional area of the electrochemical cell is matched to the cross-sectional area of the accommodation compartment. In other words, the cross-sectional area of the electrochemical cell also tapers in the direction of the vehicle vertical axis, when in its installed position. The physical space available in the motor vehicle is therefore utilized particularly well.

One example of an accommodation compartment such as this is a center tunnel in the motor vehicle. Particularly in the case of electrically powered motor vehicles, which do not have a universally jointed propulsion shaft and do not have an exhaust gas system, the center tunnel can be used to accommodate other components of the motor vehicle. Because the cross-sectional area of the electrochemical cell tapers, it is particularly well matched to the cross section of the center tunnel, which tapers in the vehicle vertical direction. Virtually the entire available space in the center tunnel can therefore be utilized for accommodation of electrochemical cells. In the case of electrically powered vehicles having a multiplicity of relatively heavy electrochemical cells, the accommodation of electrochemical cells in the center tunnel furthermore results in a good weight distribution in the motor vehicle, and this has a direct positive effect on its driving characteristics.

The electrochemical cell itself has an electrode stack comprising at least two electrodes arranged in parallel. It is therefore a stack cell. The electrodes are preferably designed such that a cross-sectional area of the electrodes decreases with increasing distance from a connection via which the respective electrode is connected to an associated tap pole of the cell. This can be achieved by the electrode tapering in the form of a wedge away from the connection. This results in the battery having particularly good electrochemical characteristics.

Specifically, because of the internal resistance of the electrode, more charge carriers are passed over into the electrolyte per unit area element of the electrode the closer the unit area element under consideration is arranged to the connection of the electrode. This inhomogeneity of the current flow over the electrode area results in an inhomogeneous thermal load on the cell. This leads to feedback, since both the resistance of the electrode itself and the continuity resistance from the electrode into the electrolyte falls as the temperature rises. In consequence, the current flow density in the vicinity of the connection also additionally rises, until an equilibrium occurs. The highly inhomogeneous current and temperature distribution often results in premature aging of the electrochemical cell, which, particularly in the case of high-performance rechargeable batteries in the automobile area, can lead to early replacement of cells or battery systems, thus resulting in high costs for the manufacturer.

Since the described electrode in the area close to the connection with a particularly high current density has a particularly large cross-sectional area, the internal resistance of the electrode is particularly low there, as a result of which only minor thermal loads occur. In addition to the very good utilization of the installation space, this therefore at the same time results in the electrochemical cell having a particularly long life.

Alternatively or additionally, the electrode can become narrower away from a base edge on the connection side, at right angles to the stacking direction of the electrodes. This results in a correspondingly larger area for charge carriers to pass through from the electrode into the electrolyte, and vice versa, in the immediate vicinity of the connection—that is to say in the area of the highest current density per unit area. As the distance from the connection increases, this passage area decreases, resulting in an substantially homogeneous current density per unit area over the entire electrode, because the charge carriers passing through likewise decrease. This therefore avoids damage and wear phenomena resulting from inhomogeneities in the current density per unit area, and therefore different temperatures within the cell, such as those which occur in stack cells known from the related art with the rectangular cross section.

While the electrochemical cell is in the installed position in the motor vehicle, the stacking direction of the electrodes in this case runs at right angles to the tapering cross-sectional area of the installation space. The connection of the electrodes is located on the lower side of the electrodes in the vehicle vertical direction. The matching of the cross-sectional area of the electrochemical cell to the shape of the installation space is therefore achieved by the shape of the electrodes.

The electrode preferably has mirror-image symmetry with respect to a center perpendicular to the base edge. A gradient relating to the available passage area and the internal resistance therefore occurs only in the direction away from the connection of the electrode, at right angles to the stacking direction. The shape of the electrode therefore does not introduce any additional asymmetries, which could in turn lead to inhomogeneities in the current density per unit area.

In a first embodiment variant, the electrode has a further edge parallel to the base edge. In the simplest case, an electrode such as this may be trapezoidal. Depending on the overall shape of the cell, which may possibly have further influences on the homogeneity of the current flow, the electrode may also have a shape other than a trapezoidal rectangular shape. In this embodiment, the side edges of the electrode which connect the base edge and the further edge are curved. As an alternative to this, it is also possible to dispense with the edge opposite the base edge, with the end points of the base edge in this embodiment being connected via a curved edge in the form of a conical section. In the simplest case, the electrode is therefore in the form of a circle segment or an ellipse segment, although it may also be paraboloid or the like.

Furthermore, a connecting tongue for connection of the electrode to the associated tap pole of the electrochemical cell is preferably arranged on the side of the base edge of each electrode. Since the base edge represents the broadest area of the electrode, the largest electrode area is therefore available in the area of the highest charge carrier passage between the electrode and the electrolyte.

In order to avoid further inhomogeneities in the current flow and in the heat development, which can result from the relative position of the electrodes with respect to one another in the stack, the electrodes are preferably arranged superimposed in the electrode stack. Therefore, the base edges and therefore the connecting tongues of the electrode are also located on the same side of the electrode stack, as a result of which the internal connection of the electrodes of the electrode stack to the tap poles of the electrochemical cell is particularly simple.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
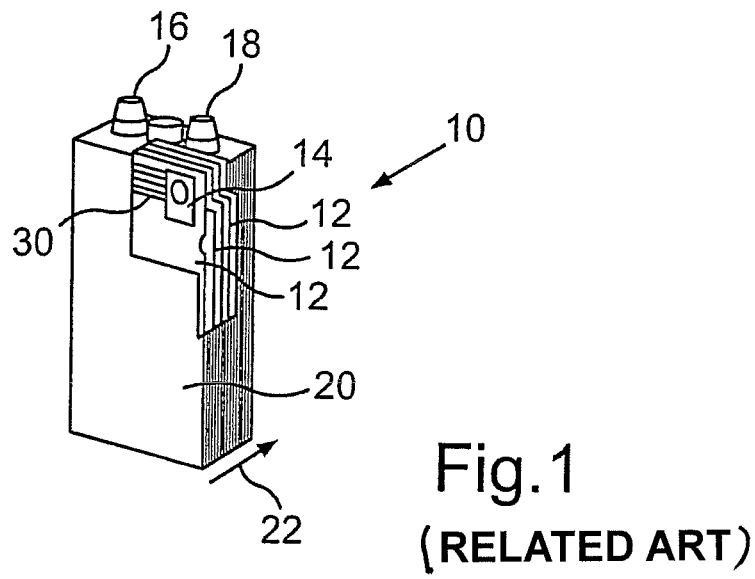
FIG. 1 shows a partially sectioned view of a stack cell according to the related art.

Reference will now be made in detail to the preferred embodiments of the present invention, examples of which are illustrated in the accompanying drawings, wherein like reference numerals refer to like elements throughout.

A prismatic stack cell, which is annotated 10 in its entirety and is known from the related art, comprises a stack of electrodes 12, which are connected to respectively associated tap poles 16, 18 of the cell 10 via connecting tongues 14, which are not all shown, for the sake of clarity. The electrodes 12 are arranged in a cell housing 20, with an electrolyte flowing around them. In the case of the stack cells known from the related art, the electrodes 12 are rectangular.

Since the material of the electrodes 12 themselves has an internal resistance which cannot be ignored, the current density between the electrode 12 and the electrolyte of cells such as these is dependent on the distance between the area element under consideration and the connecting tongue 14. The further the area element under consideration is away from the connecting tongue 14, the greater is the resistance of the electrode 12 between the connecting tongue 14 and the area element. The charge carrier passage between the electrode 12 and the electrolyte is therefore greatest in the area close to the connecting tongue 14, and decreases continuously from there. This results in a non-uniform thermal load on the cell 10, since the heat development at the electrodes 12 is proportional to the current flow into the electrolyte. Mostly heat is therefore created in the area of the connecting tongues 14. In consequence, the resistance of the electrode 12 decreases further in the area close to the connecting tongues 14, thus further increasing the current flow and therefore the heat development until, in the end, an equilibrium occurs. The inhomogeneous temperature distribution in the cell 10 leads to premature wear of the cell 10, and in the end to its failure.

In order to increase the life of cells such as these, it is therefore desirable for the current flow within the cell to be as homogeneous as possible. This is possible with the electrode shapes illustrated schematically in FIGS. 2 to 5. In this case, FIGS. 2 to 5 show plan views of the electrodes in the stacking direction, which is symbolized by the arrow 22 in FIG. 1. In this case, only half of the electrodes are illustrated in FIGS. 2 to 5, and they should in each case be understood as having mirror-image symmetry about the axes 24. The inventors' proposed cell differs from the cell illustrated in FIG. 1 only by the shape of the electrodes and, possibly, by a housing which is matched to the electrode shape.

The homogenization of the current density over the entire cell is achieved in all the illustrated exemplary embodiments by the respective electrode 26 tapering away from a base edge 28. In this case, the base edge 28 corresponds to the edge 30 of the electrodes 12 from FIG. 1, that is to say that edge on which the connecting tongue 14 is arranged.

The closer an area element of the electrode 26 is arranged to the base edge 28, the less is its distance from a connecting tongue which is not illustrated in FIGS. 2 to 5. In order to counteract the gradient of the charge carrier passage from the electrode 26 into the electrolyte, as explained above and which is dependent on the internal resistance of the electrode 26, the electrodes illustrated in FIGS. 2 to 5 therefore taper away from the base edge 28. In other words, in areas with a high charge carrier passage, the width d1 of the electrodes 26 is greater than the width d2 in areas of the electrode with a low charge carrier passage into the electrolyte. The current density per unit area is therefore homogenized over the surface area 32 of the electrode 26. Because the current density per unit area is now uniform, the heat development, which is caused by the current flow and the electrode reaction, is therefore also substantially constant over the entire surface area 32 of the electrode 26. This therefore avoids wear caused by nonhomogeneous thermal loads.

In this case, the precise shape of the electrode 26 may be further adapted in order, for example in conjunction with cooling systems which are not illustrated here, to ensure even better homogenization of the temperature distribution in the cell, or else to match the shape of the electrode 26, and therefore of the entire cell using the electrode 26, to the physical space circumstances of its installation location. Because the electrodes 26 taper away from their base edge 28, cells with shapes such as these are particularly highly suitable for use in motor vehicle technology, in particular for plug-in hybrids, range-extender battery vehicles, or else pure electrical vehicles. There is also a physical space advantage, in addition to the advantages mentioned resulting from the more homogeneous current flow distribution in the cell. Specifically, because of the shape of the electrodes, cells such as these are particularly highly suitable for fitting in a center tunnel of a motor vehicle. They can therefore be accommodated in a particularly space-saving manner.

Figures 2, 3, 4, 5:
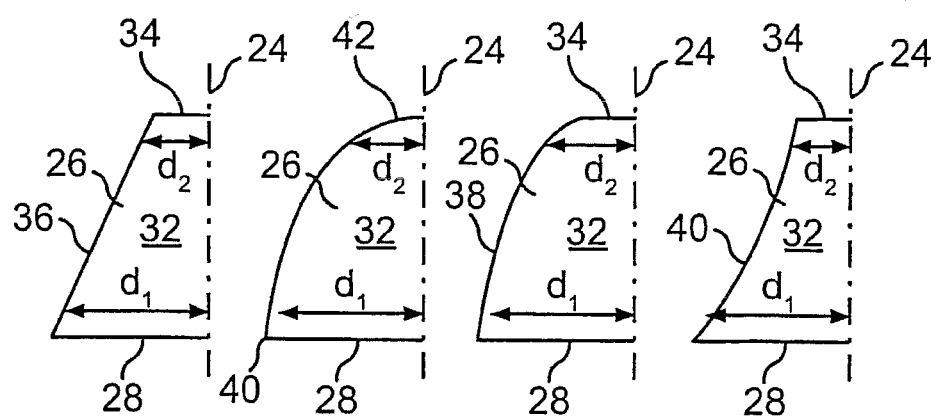
FIGS. 2-5 show various embodiments of electrodes for an electrochemical cell for a motor vehicle according to the inventors' various proposals.

The electrodes 26 shown in FIGS. 2, 4 and 5 each have a further edge 34, which is opposite the base edge 28 and is parallel to it. In the simplest case, the edges 28 and 34 are connected by a further straight edge 36, as is shown in FIG. 2, thus resulting in a trapezoidal shape 26 overall. Alternatively, the side edges 38, 40 which are arranged between the base edge 28 and the further edge 34 may also be curved, as is illustrated in FIGS. 4 and 5. In this case, both concave and convex curvatures are possible. Furthermore alternatively, it is also possible to completely dispense with a further edge which runs parallel to the base edge 28. This embodiment is shown in FIG. 3. The end points 40 of the base edge 28 are in this case connected via a single curved edge 42, which preferably follows the curve of a conical section.

The overall electrode 26 is therefore in the form of a circle or ellipse segment, or a sectioned paraboloid.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A motor vehicle having a horizontal axis in a plane of travel and a vertical axis perpendicular to the plane of travel, the motor vehicle comprising:
an engine compartment;
an accommodation compartment outside of the engine compartment, the accommodation compartment having a cross-sectional area which tapers in a direction of the vertical axis of the vehicle; and
an electrochemical cell arranged in the accommodation compartment, the electrochemical cell comprising:
a tap pole to externally connect the electrochemical cell; and
an electrode stack comprising at least two electrodes arranged in parallel, the electrode stack having a connection to the tap pole, the electrode stack having a cross-sectional area that decreases with increasing distance from the connection.

2. The motor vehicle according to claim 1, wherein
each electrode has at least one terminal such that the electrode stack has a plurality of terminals, and
the terminals for the electrodes of the electrode stack are arranged on a common side of the electrode stack.

3. A motor vehicle according to claim 2, wherein
the electrodes are stacked in a stacking direction that runs parallel to a plane of the common side of the electrode stack,
each electrode has a base edge in the common side of the electrode stack, and
each electrode tapers away from the base edge, at a right angle to the stacking direction.

4. The motor vehicle according to claim 2, wherein
each electrode has a length and a width,
the electrodes are stacked such that the length of each electrode extends perpendicular from the common side of the electrode stack, and
the width of each electrode tapers away from the common side.

5. The motor vehicle according to claim 3, wherein
each electrode has a center line that extends perpendicular from the base edge, and
each electrode has mirror-image symmetry with respect to the center line.

6. The motor vehicle according to claim 3, wherein each electrode has a further edge, which is parallel to the base edge.

7. The motor vehicle according to claim 6, wherein
each electrode has a shape defined by the base edge, the further edge and connecting side edges, and
the shape of each electrode is trapezoidal.

8. The motor vehicle according to claim 6, wherein
each electrode has side edges which connect the base edge and the further edge, and
the side edges are curved.

9. The motor vehicle according to claim 8, wherein the side edges have a convex curvature.

10. The motor vehicle according to claim 8, wherein the side edges have a concave curvature.

11. The motor vehicle according to claim 3, wherein
end points delimit the base edge of each electrode,
each electrode has a curved edge that connects the end points of the base edge, and
the curved edge has a profile that follows a conical section.

12. The motor vehicle according to claim 1, wherein
the electrodes are stacked in a stacking direction,
each electrode has a base side having a length that extends at a right angle to the stacking direction, and
each electrode has a connecting tongue on the base side for the connection to the tap pole.

13. The motor vehicle according to claim 2, wherein
each terminal is formed by a connecting tongue extending from a base of the electrode.

14. The motor vehicle according to claim 1, wherein
each electrode has first and second opposing sides, with an anode being provided on the first side and a cathode being provided on the second side, and
the electrodes are arranged superimposed in the electrode stack such that the electrode stack has an alternating sequence of anodes and cathodes.

15. The motor vehicle according to claim 1, wherein the cross-sectional area of the electrode stack is matched to the cross-sectional area of the accommodation compartment.

16. The motor vehicle according to claim 1, wherein
the motor vehicle has a front and a back, with a center tunnel running from the front to the back, and
the accommodation compartment is defined by the center tunnel of the vehicle.

* * * * *